United States Patent
Koyama

(10) Patent No.: US 7,925,970 B2
(45) Date of Patent: Apr. 12, 2011

(54) INFORMATION PROCESSING SYSTEM THAT MANAGES STORED CONTENT USING PLAYLISTS

(75) Inventor: Nobukazu Koyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1103 days.

(21) Appl. No.: 11/374,133

(22) Filed: Mar. 14, 2006

(65) Prior Publication Data

US 2006/0227632 A1 Oct. 12, 2006

(30) Foreign Application Priority Data

Mar. 17, 2005 (JP) ................................ 2005-076697

(51) Int. Cl.
G06F 17/00 (2006.01)
G06F 17/30 (2006.01)
(52) U.S. Cl. ......... 715/234; 715/210; 715/721; 715/736
(58) Field of Classification Search .................. 715/234, 715/210; 707/721, 736
See application file for complete search history.

(56) References Cited

U.S. PATENT DOCUMENTS

| | | | | |
|---|---|---|---|---|
| 6,064,980 | A * | 5/2000 | Jacobi et al. ..................... 705/26 |
| 6,389,467 | B1 | 5/2002 | Eyal |
| 7,054,888 | B2 * | 5/2006 | LaChapelle et al. ....... 707/104.1 |
| 7,283,992 | B2 * | 10/2007 | Liu et al. ............................ 707/3 |
| 7,310,729 | B2 * | 12/2007 | Gordon et al. .................... 713/161 |
| 7,392,477 | B2 * | 6/2008 | Plastina et al. ................ 715/210 |
| 7,512,966 | B2 * | 3/2009 | Lyons et al. ....................... 726/1 |
| 7,533,091 | B2 * | 5/2009 | Plastina et al. ......................... 1/1 |
| 7,584,159 | B1 * | 9/2009 | Chakrabarti et al. ........... 706/45 |
| 7,603,414 | B2 * | 10/2009 | Rosenberg ..................... 709/204 |
| 7,685,132 | B2 * | 3/2010 | Hyman ..................... 707/999.01 |
| 7,771,320 | B2 * | 8/2010 | Riley et al. ......................... 482/9 |
| 2003/0227478 | A1 * | 12/2003 | Chatfield ....................... 345/751 |
| 2005/0210507 | A1 | 9/2005 | Hawkins et al. |
| 2006/0008256 | A1 | 1/2006 | Khedouri et al. |
| 2006/0195790 | A1 * | 8/2006 | Beaupre et al. ............... 715/727 |
| 2006/0239131 | A1 * | 10/2006 | Nathan et al. .............. 369/30.06 |
| 2006/0242106 | A1 * | 10/2006 | Bank ................................. 707/1 |

FOREIGN PATENT DOCUMENTS

EP 1 515 340 A1 3/2005
JP 2003-323181 11/2003

OTHER PUBLICATIONS

Christopher Breen, "Imixing It Up", Internet Citation, [Online], XP-002996195, Sep. 17, 2004, 3 pages.

* cited by examiner

*Primary Examiner* — Doug Hutton
*Assistant Examiner* — Soumya Dasgupta
(74) *Attorney, Agent, or Firm* — Oblon, Spivak, McClelland, Maier & Neustadt, L.L.P.

(57) ABSTRACT

A system allows a user to integrally manage content regardless whether the content is owned or not owned by the user. In a reproduction terminal, one piece of sort-out information is generated from one play list. Sort-out information is obtained by classifying the metadata of content registered with a play list into three types of metadata, search metadata, display metadata and processing metadata. The sort-out information generated in the reproduction terminal is transmitted to a reproduction terminal via a sort-out information server. In the reproduction terminal, a same play list as a play list of the reproduction terminal is created on the basis of the provided sort-out information. In the created play list, each piece of content registered with the play list is managed by making a distinction between the content owned by the user and the content not owned by the user.

3 Claims, 11 Drawing Sheets

FIG. 2

| CONTENT NAME | METADATA FOR SEARCH | METADATA FOR DISPLAY | METADATA FOR PROCESSING | | |
|---|---|---|---|---|---|
| CONTENT A | Domain=A AND ID=100<br>Titlename= CONTENT A<br>Artist= ARTIST A | Titlename= CONTENT A<br>Artist= ARTIST A | Action=PURCHASE<br>URL=http://seller URL | | |
| CONTENT B | ... | ... | | | |
| CONTENT C | ... | | | | |
| ... | | | | | |

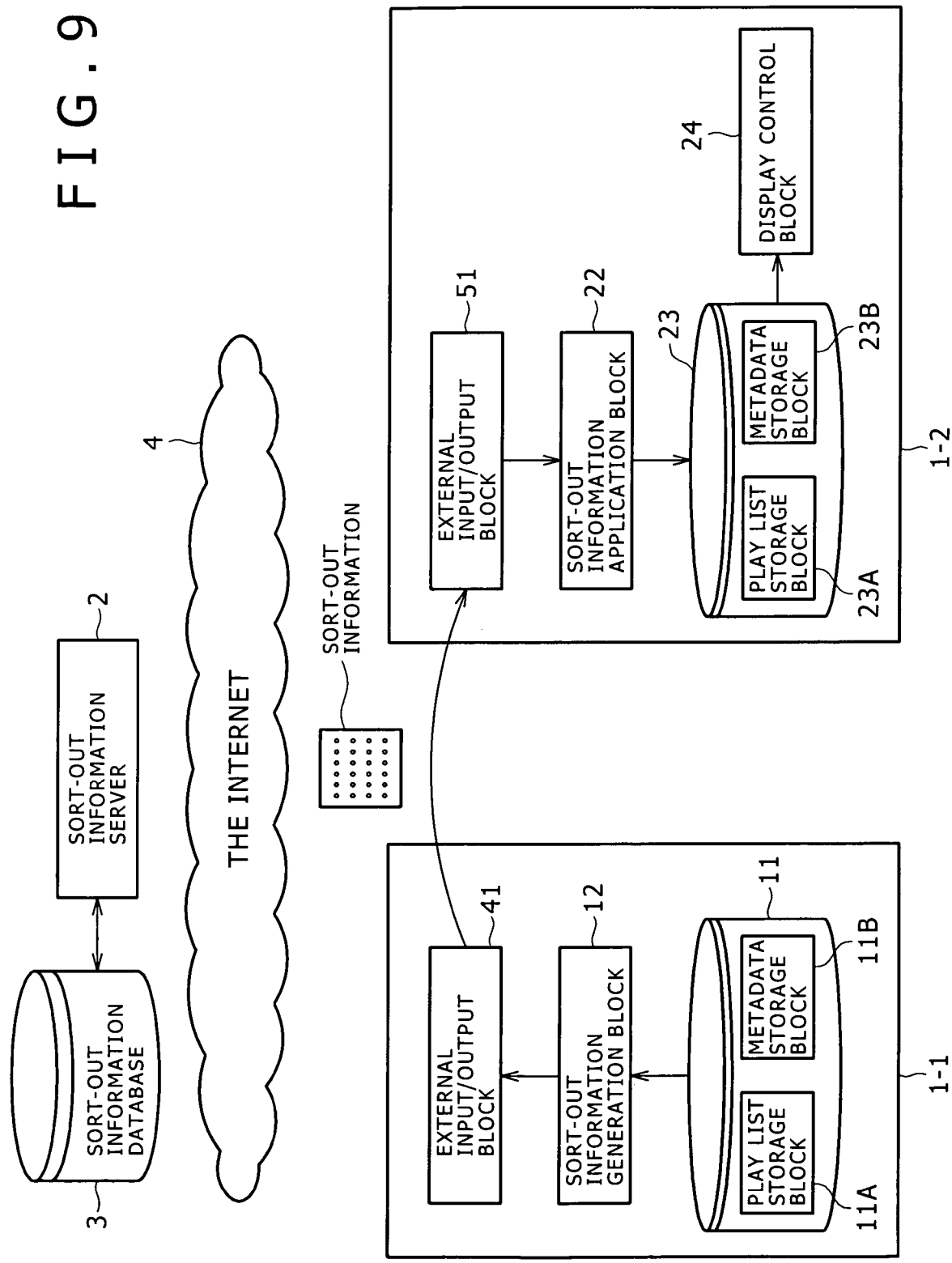

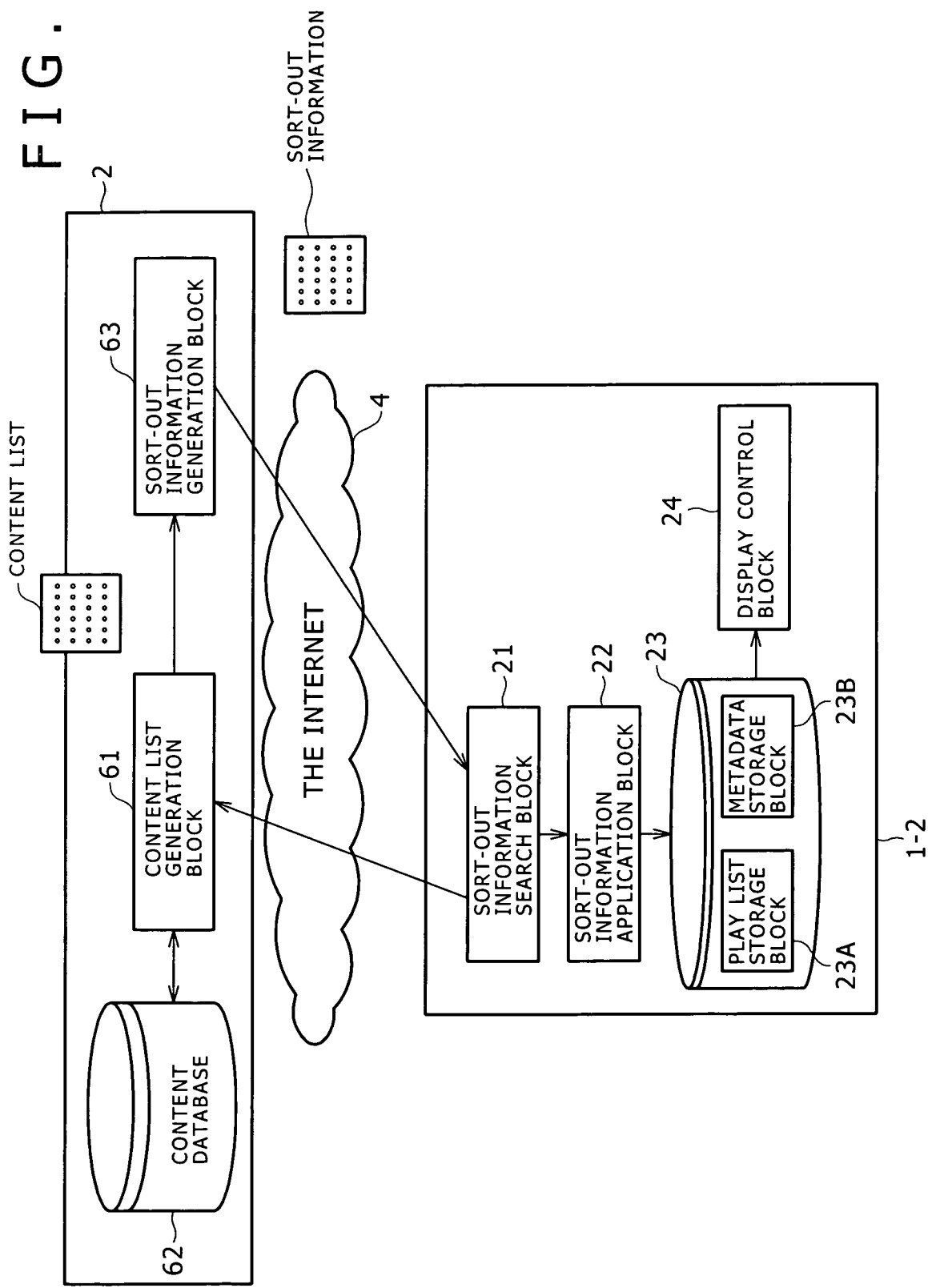

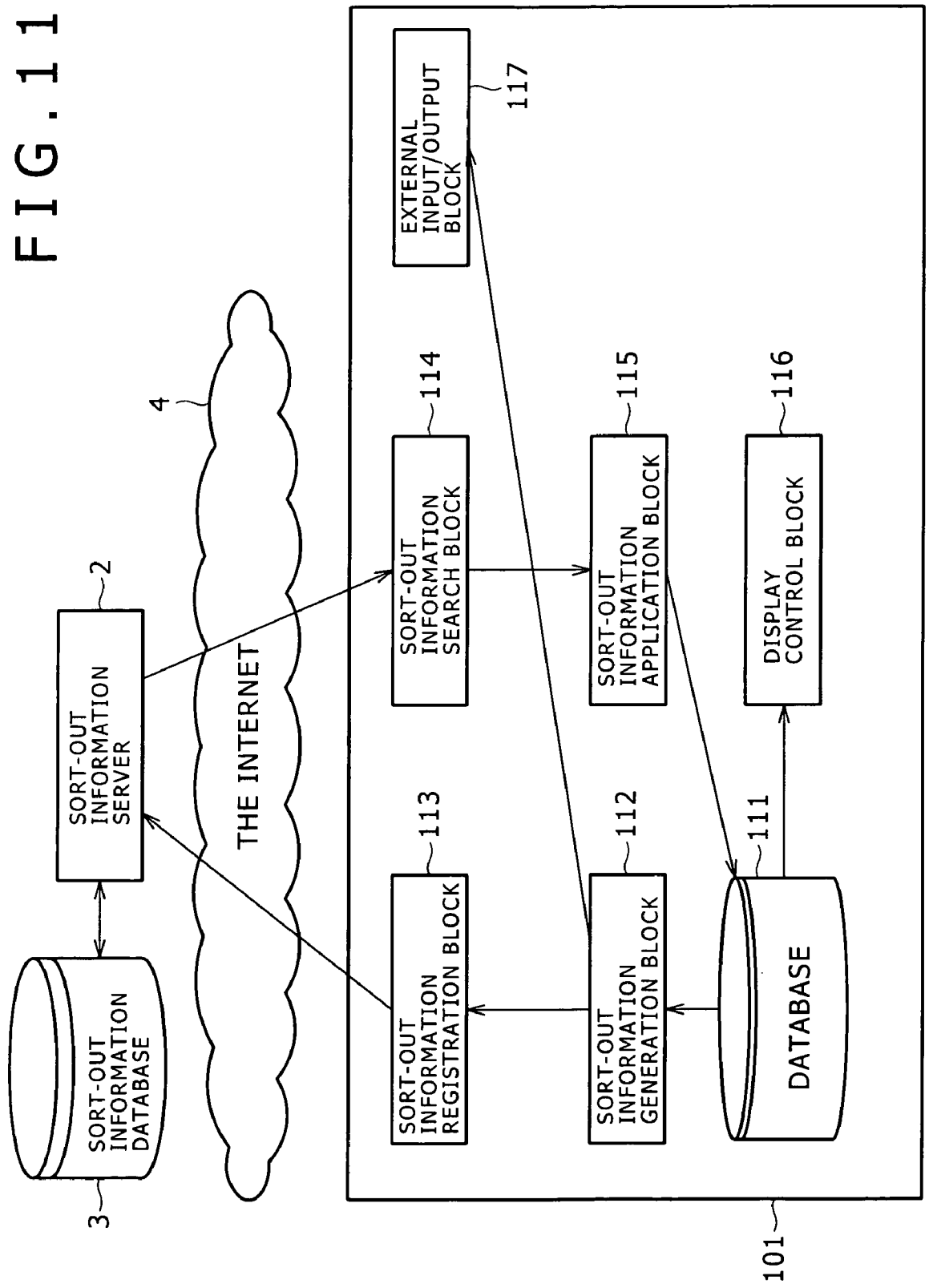

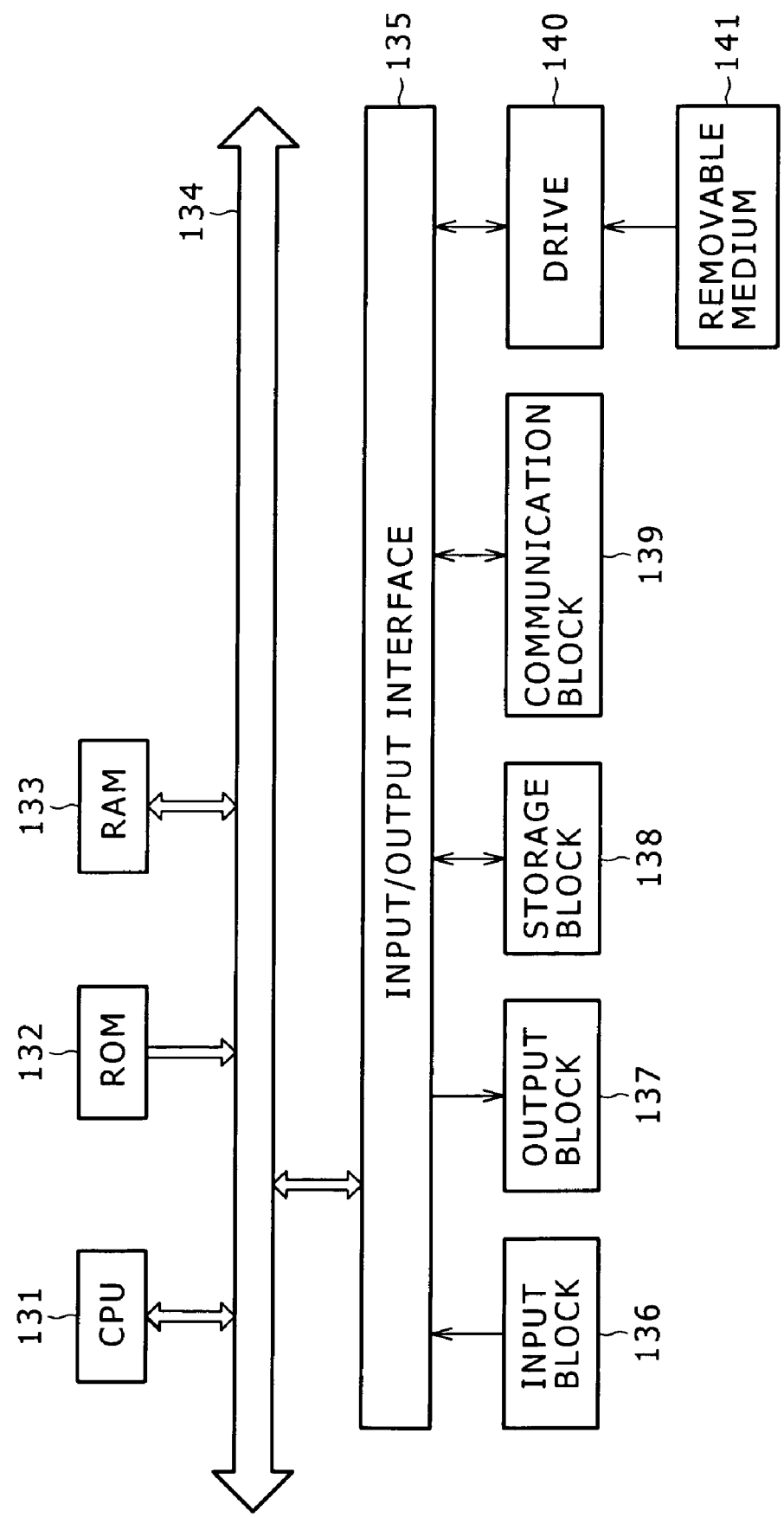

INFORMATION PROCESSING SYSTEM THAT MANAGES STORED CONTENT USING PLAYLISTS

CROSS REFERENCES TO RELATED APPLICATIONS

The present invention contains subject matter related to Japanese Patent Application JP 2005-076697 filed in the Japanese Patent Office on Mar. 17, 2005, the entire contents of which being incorporated herein by reference.

BACKGROUND OF THE INVENTION

The present invention relates to an information processing system, an information generating apparatus and method, an information processing apparatus and method, and a program and, more particularly, to an information processing system, an information generating apparatus and method, an information processing apparatus and method, and a program that are capable of integrally managing content whether it is owned or not owned.

A play list is generally used for classifying and sorting out music content data for example and managing the displaying and reproducing operations of the classified and sorted out music content data on personal computers.

Play lists are data for managing content data grouped under certain conditions, thereby specifying a sequence of reproducing the music data. Selecting a certain play list, a user is able to continuously reproduce two or more pieces of content data in a sequence registered with the selected play list and copy the entire content registered with the play list to a portable reproduction terminal, for example.

A play list is generated when a user captures music content recorded to a certain music CD (Compact Disc) into a personal computer, for example. The generated play list contains the entire music content recorded to that music CD.

A plays list is also generated in response to an operation done by a user; for example, the user himself is able to generate a music list by repeating the movement of predetermined content data (by dragging and dropping an icon thereof) selected from content stored in HDD (Hard Disc Drive) to a window for displaying a play list.

Japanese Patent Laid-open No. 2001-175624 discloses a user interface for facilitating the management of music content, such as sort-out and reproduction for example.

SUMMARY OF THE INVENTION

In the above-mentioned related-art content management method, setting aside the creation of a play list by capturing content from a music CD as described above, it significantly consumes time and labor to create a play list by manually registering content piece by piece.

Also, the content that may be registered with play list is restricted to that stored in the HDD of personal computers, for example, namely, the content owned by users, so that it is difficult to register the content that is not stored in the HDD and not owned by users.

Therefore, the present invention addresses the above-identified and other problems associated with related-art methods and apparatuses and solves the addressed problems by providing an information processing system, an information generating apparatus and method, an information processing apparatus and method, and a program that are adapted to integrally manage content whether is owned or not owned by users.

In carrying out the invention and according to an embodiment thereof, there is provided an information generating apparatus for generating information to be provided to another apparatus. This information generating apparatus has a storage block for storing a first play list for managed grouped content and a generating block for generating sort-out information that is for use in creating a second play list by the another apparatus for managing same content as content to be managed by the first play list and includes metadata of the content to be managed by the first play list.

Content includes various kinds such as music content and movie content that are grouped for management. A play list may be one that is capable of managing grouped content as one unit, so that a play list may include a so-called folder.

In carrying out the invention and according to another embodiment thereof, there is provided an information processing apparatus. This information processing apparatus has an acquiring block for acquiring the sort-out information and a creating block for determining on the basis of the metadata whether each piece of content with metadata included in the sort-out information acquired by the acquiring block is owned by a user, thereby creating the second play list in which a distinction is made between the content owned by the user and the content not owned by the user.

The above-mentioned information processing apparatus further has a display control block for displaying information indicative whether each piece of content is owned by the user along with information about each piece of content to be managed by the second play list on the basis of the second play list created by the creating block.

The above-mentioned display control block displays a button to be operated to start reproduction of content as information indicative that the content is owned by the user, or a button to be operated to access to the web site of the content seller as information indicative that the content is not owned by the user.

In carrying out the invention and according to still another embodiment thereof, there is provided an information generating apparatus for generating sort-out information that is for use in creating a second play list by the another apparatus for managing same content as content to be managed by the first play list and includes metadata of the content to be managed by the first play list.

The above-mentioned information processing apparatus determines on the basis of metadata whether each piece of content with the metadata included in the acquired sort-out information is owned by the user, thereby creating the second play list in which a distinction is made between the content owned by the user and the content not owned by the user.

According to embodiments of the present invention, content may be managed in an integrated manner.

BRIEF DESCRIPTION OF THE DRAWINGS

Other objects and aspects of the invention will become apparent from the following description of embodiments with reference to the accompanying drawings in which:

FIG. 2 is a chart indicative of exemplary sort-out information;

FIG. 9 is a schematic diagram illustrating an exemplary configuration of another information processing system practiced as one embodiment of the invention;

FIG. 10 is a schematic diagram illustrating an exemplary configuration of still another information processing system practiced as one embodiment of the invention;

FIG. 11 is a schematic diagram illustrating an exemplary configuration of a reproduction terminal; and FIG. 12 is a block diagram illustrating an exemplary configuration of a personal computer.

DETAILED DESCRIPTION OF THE PREFERRED EMBODIMENTS

This invention will be described in further detail by way of embodiments thereof with reference to the accompanying drawings. This invention will be described in further detail by way of example with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

Further, the description hereof does not denote the entire invention described herein. In other words, the existence of any invention described herein and not claimed herein will not deny the existence of any inventions that may be filed as a divisional application, emerge as a result of amendment, or added hereto in the future.

Figure 1:
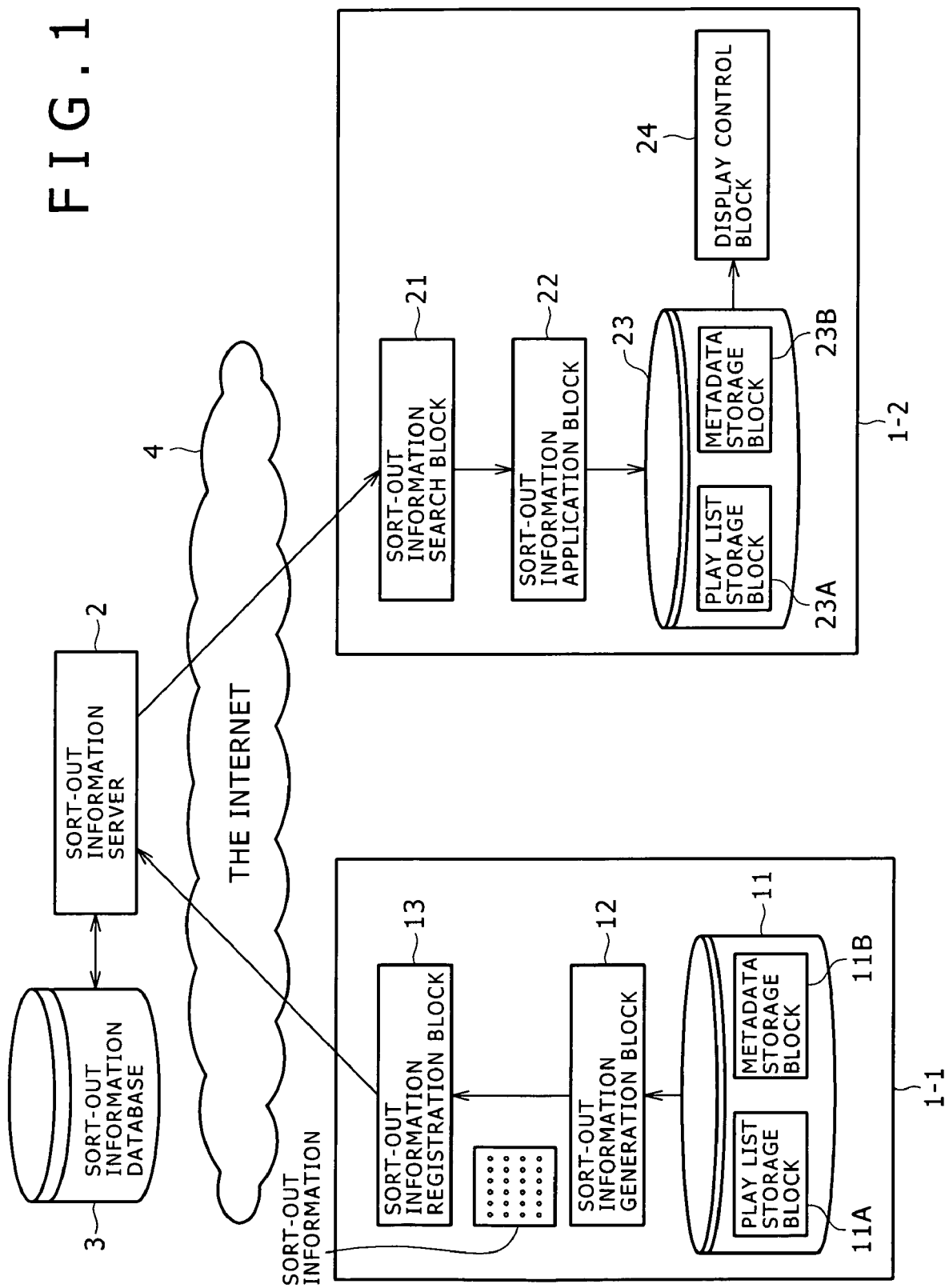
FIG. 1 is a schematic diagram illustrating an exemplary configuration of an information processing system practiced as one embodiment of the invention.

An information processing system practiced as one embodiment of the invention has an information generating apparatus (for example, a reproduction terminal 1-1 shown in FIG. 1) and an information processing apparatus (for example, a reproduction terminal 1-2 shown in FIG. 1). The information generating apparatus has storage means (for example, a play list storage block 11A shown in FIG. 1) for storing a first play list for managing grouped content and generating means (for example, a sort-out information generation block 12 shown in FIG. 1) for generating sort-out information for use by the information processing apparatus in creating a second play list for managing same content as the content to be managed by the first play list, the sort-out information including metadata of the content to be managed by the first play list.

The information processing apparatus has acquiring means (for example, a sort-out information search block 21 shown in FIG. 1) for acquiring the sort-out information generated by the information generating apparatus and creating means (for example, a sort-out information application block 22 shown in FIG. 1) for determining on the basis of the metadata whether or not each piece of content with metadata included in the sort-out information acquired by the acquiring means is owned by a user, thereby creating the second play list in which a distinction is made between pieces of content owned by the user and not owned by the user.

Another information generating apparatus is generally the same in the embodiments corresponding to the means (illustrative only) as the information generating apparatus of the information processing system.

Figure 4:
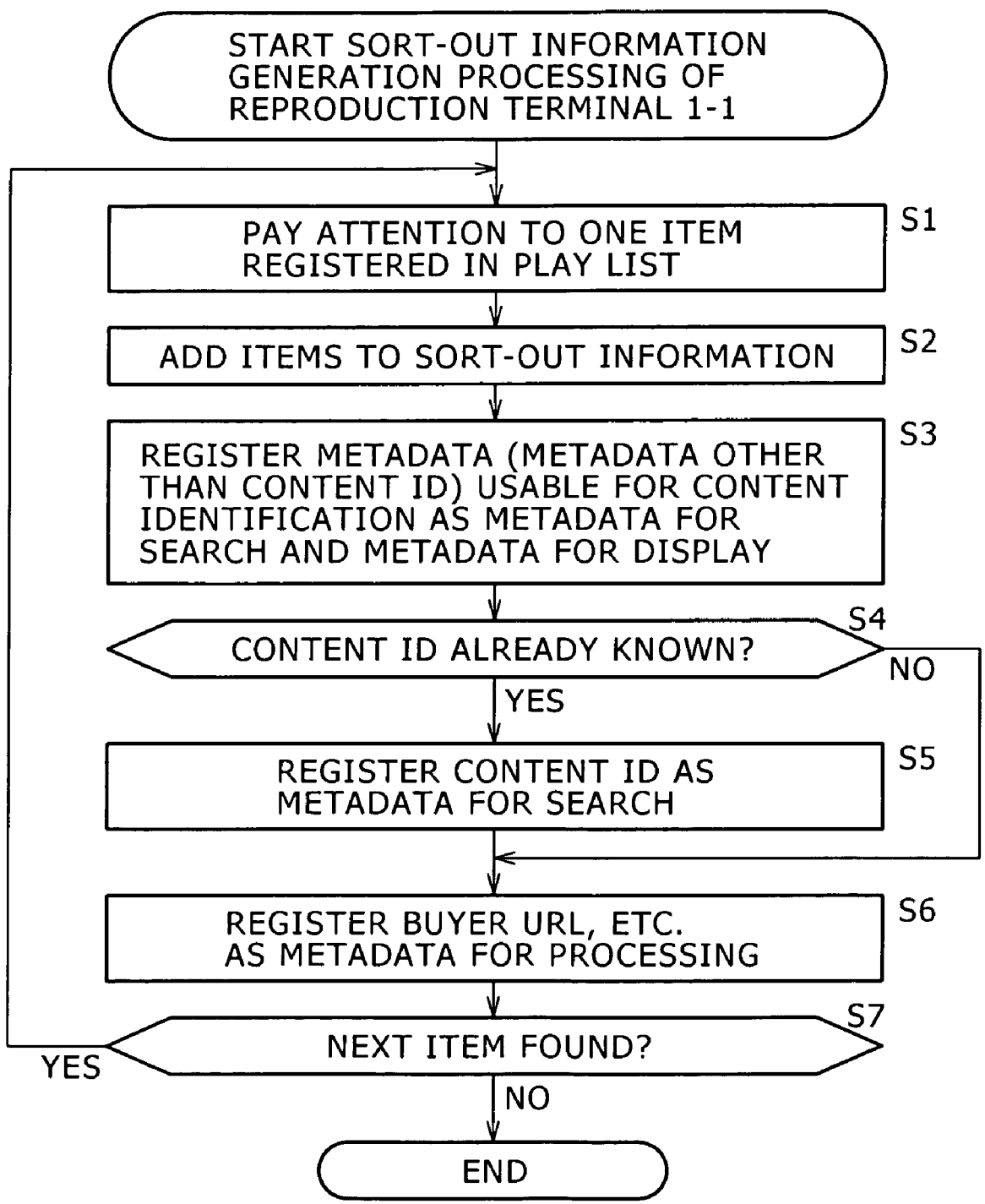
FIG. 4 is a flowchart indicative of sort-out information generation processing of a reproduction terminal.

An information generating method and a program each have the steps of generating sort-out information that is for use in creating a second play list by the apparatus for managing same content as content to be managed by the first play list and includes metadata of the content to be managed by the first play list (for example, step S3 shown in FIG. 4).

Another information processing apparatus is generally the same in the embodiments corresponding to the means (illustrative only) as the information processing apparatus of the information processing system.

The above-mentioned information processing apparatus further has display control means (for example, a display control block 24 shown in FIG. 1) for displaying information indicative whether each piece of content is owned by the user along with information about each piece of content to be managed by the second play list on the basis of the second play list created by the creating means.

Figure 6:
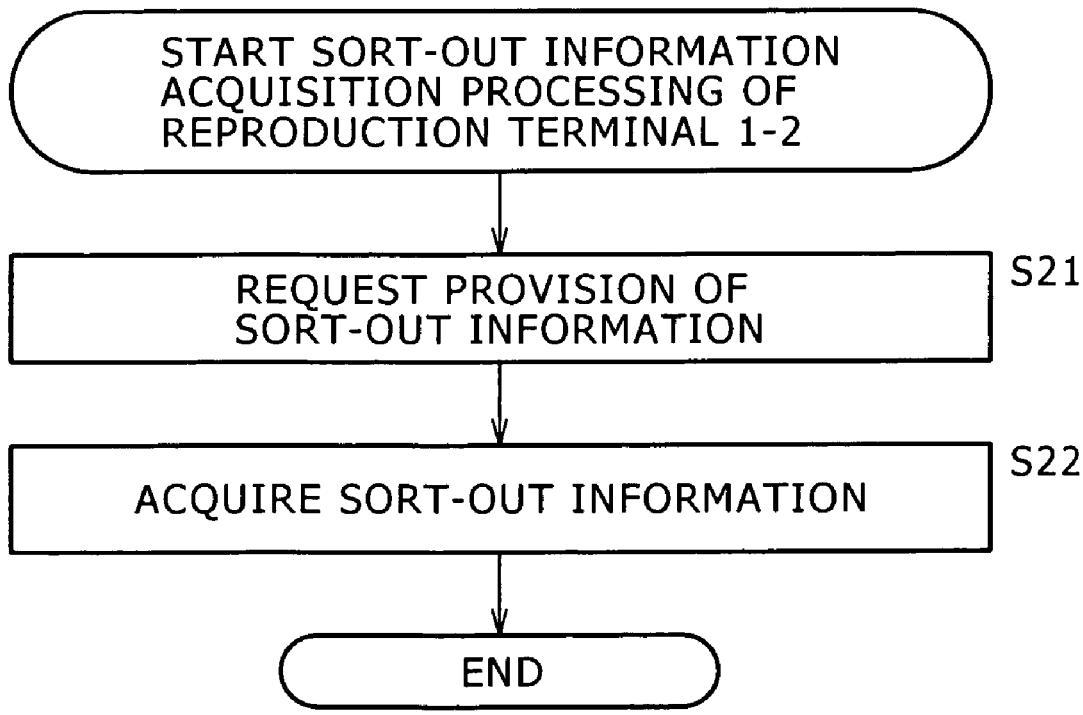
FIG. 6 is a flowchart indicative of sort-out information acquisition processing of another reproducing terminal.
Figure 7:
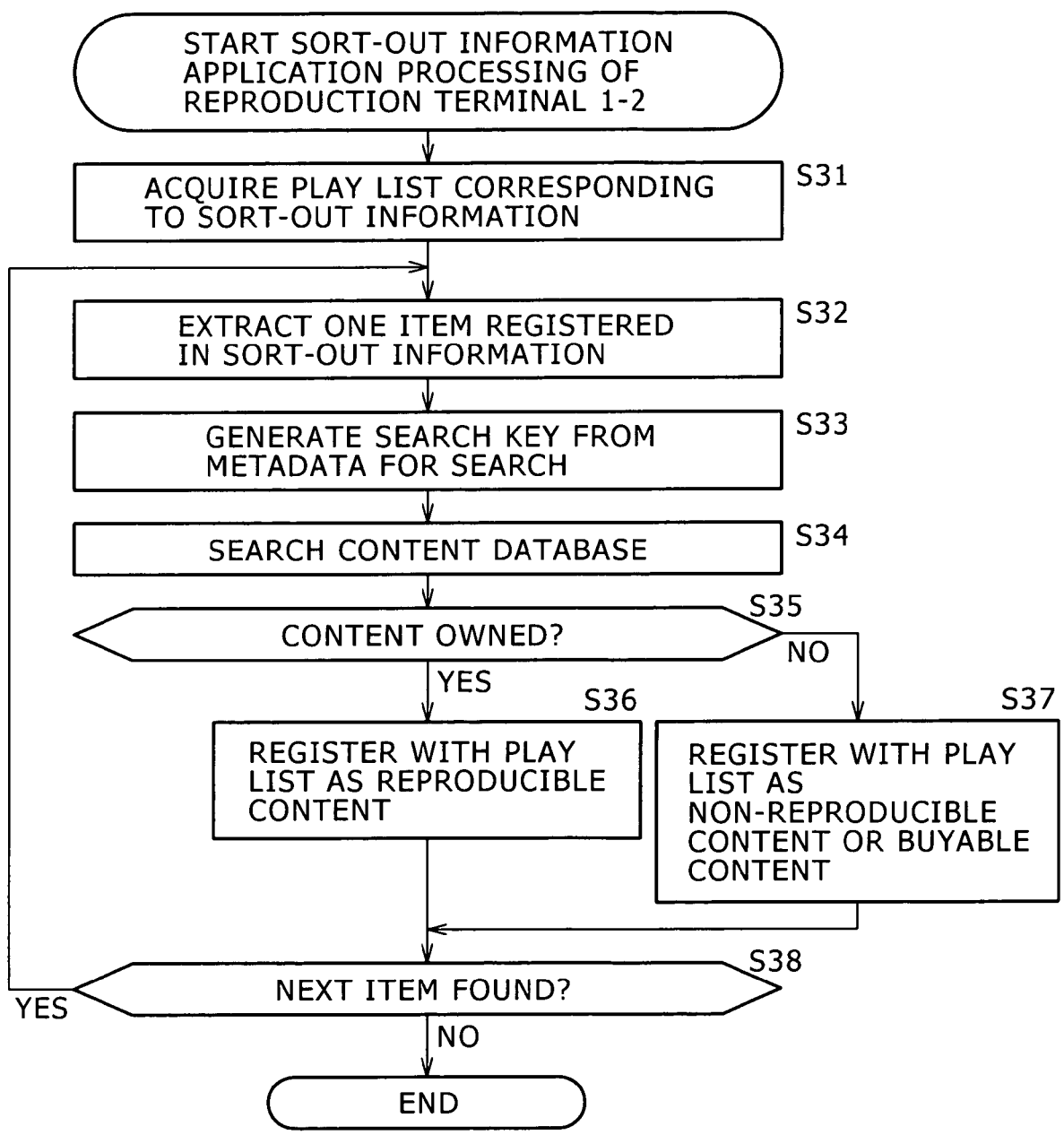
FIG. 7 is a flowchart indicative of sort-out information application processing of the another reproduction terminal.

Another information processing method and another program each have the steps of acquiring the sort-out information (for example, step S22 shown in FIG. 6) and determining on the basis of the metadata whether each piece of content with metadata included in the sort-out information acquired in the acquisition step is owned by a user, thereby creating the second play list in which a distinction is made between the content owned by the user and the content not owned by the user (for example, step S36 shown in FIG. 7).

The following describes embodiments of the present invention with reference to accompanying drawings.

Now, referring to FIG. 1, there is shown an exemplary configuration of an information processing system practiced as one embodiment of the invention.

The information processing system is configured by reproduction terminals 1-1 and 1-2 and a sort-out information sever 2 interconnected via the Internet 4. The sort-out information server 2 is connected with a sort-out information database 3. The following mainly describes a case in which content to be processed in the information processing system shown in FIG. 1 is music content. Generally the same processing as above is executed also on various types of content that are grouped for management, in addition to moving image content such as television programs and movies.

The reproduction terminal 1-1 reproduces content stored in an incorporated content database, not shown, in response to an operation done by the user. Also, the reproduction terminal 1-1 creates a play list for sorting out and reproducing content stored in the content database. The reproduction terminal 1-1 is configured by a database 11, a sort-out information generation block 12, and a sort-out information registration block 13.

The database 11 is configured by a play list storage block 11A and a metadata storage block 11B. The play list storage block 11A stores play lists created by the user.

The metadata storage block 11B stores metadata that is stored in the content database and is ready for reproduction by the reproduction terminal 1-1. Metadata includes information such as content provider, ID allocated by the content provider, title, artist name, acquisition route, and URL (Uniform Resource Locator) of a sale site if the acquisition route is the purchase by downloading music content from the sale site, for example. Metadata is acquired by user input or downloading from predetermined sites, for example.

The sort-out information generation block 12 generates sort-out information that includes the metadata of content registered with play lists (or managed thereby), from the play lists stored in the play list storage block 11A. Sort-out information, which is used for creating play lists for managing same content on another device such as the reproduction terminal 1-2 shown in FIG. 1 for example, includes three types metadata, metadata for search, metadata for display, and metadata for processing.

Namely, sequentially paying attention to the pieces of content registered with a play list read from the play list storage block 11A, the sort-out information generation block 12 classifies the metadata of the pieces of content stored in the metadata storage block 11B into three types of metadata for search, display, and processing, thereby generating sort-out information. For example, one piece of sort-out information is generated from one play list.

Referring to FIG. 2, there is shown one example of sort-out information.

The sort-out information shown in FIG. 2 is generated from a play list that manages pieces of content A, B, C, and so on and includes the metadata of these pieces of content.

For example, for content A, "Domain=A" indicative of the providing source of content A, "ID=100" indicative of the ID of content A allocated by that providing source, "Content A" indicative of the title of content A, and "Artist A" indicative of the artist name of content A are registered as search metadata.

Search metadata is used by the sort-out information server 2 for searching for the sort-out information to be provided in response to a request from another device such as the reproduction terminal 1-2 shown in FIG. 1, for example. Thus, it is also practicable to register two or more pieces of metadata (or attribute values) for one type of metadata.

For display metadata, "Content A" indicative of the title of content A and "Artist A" indicative of the artist name of content A are registered (the contents of search metadata partially overlap the contents of display metadata).

Display metadata is used for displaying, on a content management screen, the information of content registered with a play list. As will be described later, a content management screen displays, in a list form, content titles registered with play lists. In addition to artist names and titles, various kinds of data may be registered as display metadata, such as one allowing the user to identify content by displaying on screen like a thumbnail image of the jacket of a music CD if content is captured therefrom.

Further, in the example shown in FIG. 2, that the acquisition route of content A is by downloading (Action=purchase) and the URL ("URL=http://seller URL") are registered as processing metadata.

Processing metadata is used, if another device such as the reproduction terminal 1-2 shown in FIG. 1 has no content with metadata included in the sort-out information generated by the reproduction terminal 1-1, to execute predetermined processing such as accessing the sale site of that content.

For other pieces of contents (including content B and content C) registered with the same play list along with content A, the metadata of these other pieces of content are classified and registered as sort-out information.

It should be noted that, in the example shown in FIG. 2, the sort-out information is configured by arranging the metadata of each piece of content in the form of a table; however, it is also practicable to take a tree structure rather than a table in structure.

Referring to FIG. 1 again, the sort-out information generated by the sort-out information generation block 12 is outputted to the sort-out information registration block 13.

The sort-out information registration block 13 transmits (or uploads) the sort-out information generated by the sort-out information generation block 12 to the sort-out information server 2 via the Internet 4. The uploaded sort-out information is managed by the sort-out information server 2 to be provided, from time to time, to such devices accessing the sort-out information server 2 as the reproduction terminal 1-2.

Like the reproduction terminal 1-1, the reproduction terminal 1-2 reproduces content stored in a content data base, not shown, incorporated therein in response to an operation done by the user, for example. Also, the reproduction terminal 1-2 creates play lists for managing the sorting out and reproduction of the content stored in the content database and displays a content management screen on the basis of the created play lists. The reproduction terminal 1-2 is configured by a sort-out information search block 21, a sort-out information application block 22, a database 23, and a display control block 24.

The sort-out information search block 21 requests the sort-out information server 2 via the Internet 4 for the provision of sort-out information that satisfies predetermined conditions. For example, the sort-out information search block 21 notifies the sort-out information server 2 of a predetermined artist name as a condition for the provision of requested sort-out information.

In this case, in the sort-out information server 2, the sort-out information stored in the sort-out information database 3 is searched for sort-out information with the same artist name as one transmitted from the sort-out information search block 21 included in the search metadata; if such sort-out information is found, then the sort-out information is provided to the sort-out information search block 21. As described with reference to FIG. 2, sort-out information has the artist name for example of content as search metadata.

It is also practicable to use another sort-out information condition; that is, instead of the artist name, the titles of all pieces of content registered with the play lists already owned by the reproduction terminal 1-2 may be given to search for the sort-out information (or the sort-out information generated from the same play list) with the same titles as the above-mentioned titles included.

The sort-out information search block 21 acquires the sort-out information supplied from the sort-out information server 2 and outputs the acquired sort-out information to the sort-out information application block 22.

The sort-out information application block 22 creates a play list on the basis of the sort-out information supplied from the sort-out information search block 21.

For example, when sort-out information comes from the sort-out information search block 21, the sort-out information application block 22 references the content database, not shown, incorporated therein to determine which of the pieces of content with metadata included in the sort-out information is owned (or which piece of content is stored in the content database in a reproducible form), on the basis of the metadata included in the sort-out information. As a result of this decision, the sort-out information application block 22 registers, with a play list, all pieces of content with metadata registered with the sort-out information by classifying these pieces of content into owned content and not owned content, thereby creating one play list.

Consequently, if the sort-out information generated by the reproduction terminal 1-1 is supplied to the reproduction terminal 1-2, the same play list as the play list owned by the reproduction terminal 1-1 that lists pieces of content classified by being owned and not owned is obtained on the reproduction terminal 1-2. That is, through the information generated from an original play list, namely, sort-out information, a play list is provided from the reproduction terminal 1-1 to the reproduction terminal 1-2 and the distinction between the content owned and the content not owned to be registered with the play list is made on the reproduction terminal 1-2, the destination of the play list provision.

Thus, each play list created by the sort-out information application block 22 is stored in a play list storage block 23A of the database 23. The metadata contained in the sort-out information is outputted to a metadata storage block 23B of the database 23 to be stored therein.

The database 23 is made up of the play list storage block 23A and the metadata storage block 23B. The play list storage block 23A stores play lists created by the sort-out information application block 22.

The metadata storage block 23B stores the metadata (the metadata contained in sort-out information) supplied from the sort-out information application block 22 and the metadata of the contents stored in the incorporated content database.

The display control block 24 displays a content management screen on the basis of each play list stored in the play list storage block 23A. As described above, each play list stored in the play list storage block 23A and created on the basis of sort-out information distinguishes between the content owned and the content not owned by the user of the reproduction terminal 1-2.

Figure 3:
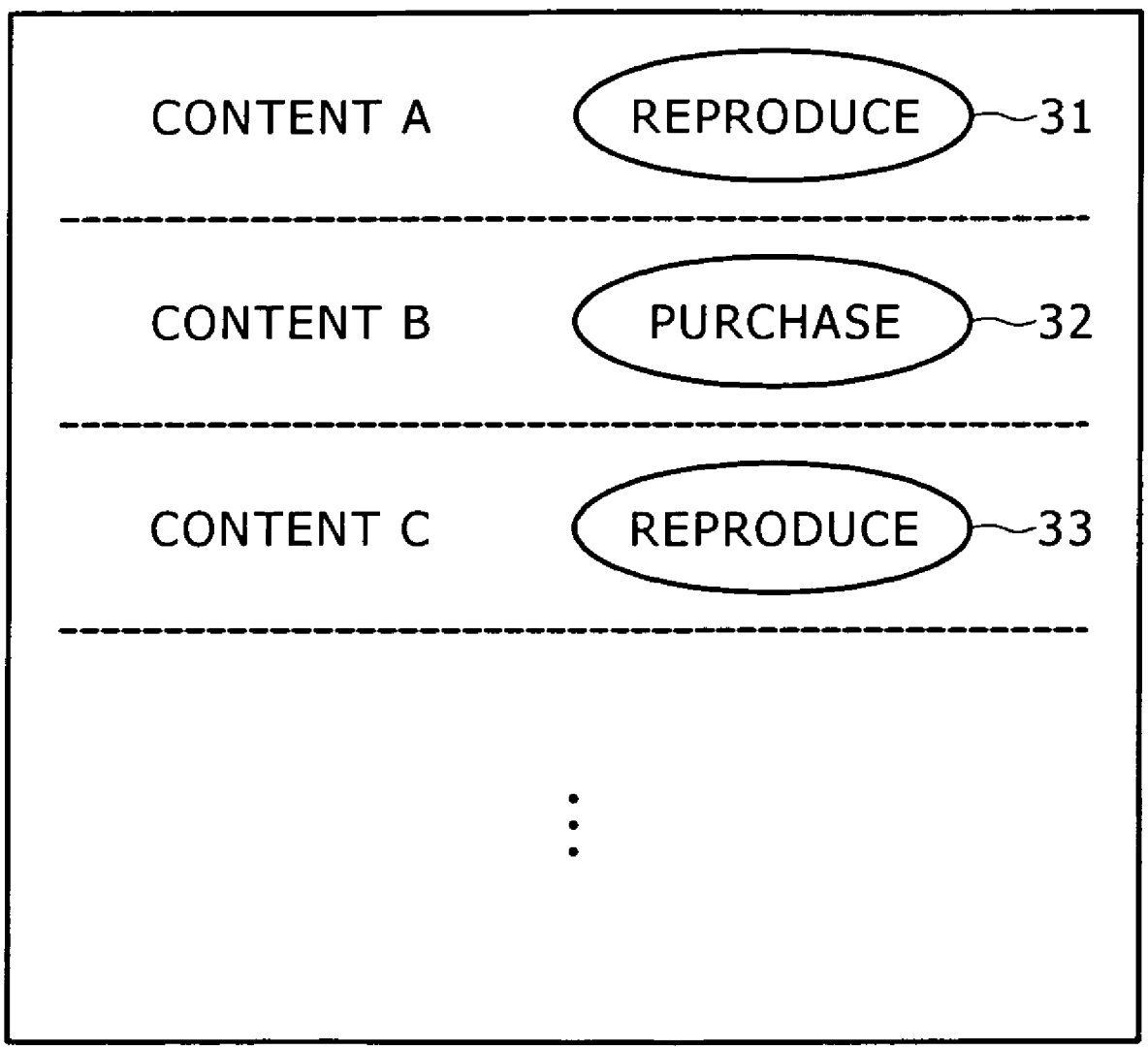
FIG. 3 is a chart indicative of an exemplary content management screen.

Referring to FIG. 3, there is shown an exemplary screen to be displayed by the display control block 24.

In the example shown in FIG. 3, the screen is displayed on the basis of a play list with which content A, content B, content C, and so on are registered. A sequence of content A, content B, content C, and so on is displayed in accordance with a sequence in which these pieces of contents are registered with the play list. The titles "Content A", "Content B", and "Content C" are displayed on the basis of the display metadata ("Title=~") contained in the sort-out information provided from the sort-out information server 2.

In the example shown in FIG. 3, a reproduce button 31 is shown to the right of content A, indicating that content A may be reproduced also on the reproduction terminal 1-2 because content A is stored also in the content database of the reproduction terminal 1-2 (namely, the user of the reproduction terminal 1-2 owns content A). Pressing the reproduce button 31, the user can start the reproduction of content A.

A purchase button 32 is shown to the right of content B, indicating that content B cannot be reproduced on the reproduction terminal 1-2 because content B is not stored in the content database of the reproduction terminal 1-2 (namely, the user of the reproduction terminal 1-2 does not own content B).

Pressing purchase button 32, the user can access a sale site selling content B and download content B through a displayed screen to purchase content B. This access to the sale site selling content B is executed on the basis of a seller URL ("URL=~") of the processing metadata contained in sort-out information. Namely, the user of the reproduction terminal 1-2 purchases content B from the same sale site as the seller of the user of the reproduction terminal 1-1 if the sort-out information by which the play list has been created was generated by the reproduction terminal 1-1.

For example, if content B is purchased by the user on the screen that is displayed when the purchase button 32 is pressed, this purchase will immediately be reflected onto the play list, upon which the button shown to the right of content B turns to the reproduce button to be pressed to start reproduction of content B.

It should be noted that, if the viewing of content is enabled on the content sale site, not a purchase button but a view button to be pressed to view the content not owned may be displayed on this content.

To the right of content C, a reproduce button 33 is displayed, indicating that content C may be reproduced also on the reproduction terminal 1-2 because content C is stored in the content database of the reproduction terminal 1-2. Pressing the reproduce button 33, the user can start the reproduction of content C.

It should be noted that, in the example shown in FIG. 3, the reproduce button is shown as the information indicative that the user owns the content and the purchase button is shown as the information indicative that the user does not own the content; it is also practicable to show any other information as far as the user is able to distinguish between the content owned and the content not owned by displaying the titles of these pieces of content in different colors, for example.

Thus, the user of the reproduction terminal 1-2 is able to manage the content stored in the content database of the reproduction terminal 1-2 by use of the play list created from sort-out information (or the same play list as that managed by the reproduction terminal 1-1) without executing the work of registering the content with a play list, for example.

In addition, of the pieces of content registered with a play list, a button is displayed adjacent to each piece of content owned and, adjacent to each piece of content not owned, a button to be pressed to access the sale site setting that content is shown, so that the user is able to integrally manage all pieces of content by use of a play list regardless whether particular pieces of content are owned or not owned by the user.

Further, all pieces of content to be registered with one play list are ones grouped under certain conditions and therefore related with each other in some way or other, so that the user is able to understand through the screen as shown in FIG. 3 for example that content B not owned by the user is related with content A owned by the user. Additionally purchasing content B, the user is able to collect pieces of content not yet owned.

Operations of the reproduction terminal 1-1 and the reproduction terminal 1-2 having the above-mentioned configurations will be described later with reference to flowcharts.

The sort-out information server 2 shown in FIG. 1 receives sort-out information supplied from the sort-out information registration block 13 of the reproduction terminal 1-1 via the Internet 4 and stores the received sort-out information in the sort-out information database 3.

In addition, when a condition has been supplied from the sort-out information search block 21 of the reproduction terminal 1-2 to request the search for sort-out information, the sort-out information server 2 retrieves the sort-out information satisfying the supplied condition from among the sort-out information stored in the sort-out information database 3 and transmits the retrieved sort-out information to the reproduction terminal 1-2 via the Internet 4.

The following describes operations of the reproduction terminal 1-1 and the reproduction terminal 1-2.

First, processing by the reproduction terminal 1-1 for generating sort-out information will be described with reference to the flowchart shown in FIG. 4.

The sort-out information generation block 12 reads a play list from the play list storage block 11A of the database 11 and pays attention to one piece of content (or item) registered with the play list in step S1. For example, attention is paid to pieces of content in a sequence of the registration thereof.

It should be noted that play lists to be read here may be either those manually created by user's selecting content or those automatically created by user's entering a keyword such as artist name for example (namely, any play list with which pieces of content with same artist names contained in metadata).

In step S2, the sort-out information generation block 12 registers, with sort-out information, the content on which attention was paid in step S1. If the sort-out information has a tabular structure, then "Content A", the title of this content is entered in top box of the content name column in the sort-out information, for example. By the processing shown below, the metadata of this "Content A" is classified into three types, search, display, and processing and the classified metadata is sequentially registered with the sort-out information.

In step S3, the sort-out information generation block 12 reads the metadata of the content of current attention from the metadata storage block 11B and, of the read metadata, registers, with the sort-out information, the metadata available for content identification and other than content ID as search metadata and display metadata. For example, "Domain=A" indicative of the provider of content A is registered with the sort-out information as search metadata and "Content A" indicative of the title of content and "Artist A" indicative of the artist name of content A are registered with the sort-out information as search metadata and display metadata, respectively.

In step S4, the sort-out information generation block 12 determines whether a content ID is known or not (or whether a content ID is contained in the metadata read from the metadata storage block 11B). If the content ID is found known, then the procedure goes to step S5, in which the known content ID is registered with the sort-out information as search metadata. For example, if the content of current attention is content A, then "ID=100" is registered as search metadata as shown in FIG. 2.

If the content ID is found not known in step S4, then the processing of step S5 will be skipped.

In step S6, if a route of acquiring the content of current attention is the downloading from the sale site of that content, then the sort-out information generation block 12 registers the URL of the sale site of the seller with the sort-out information as processing metadata. As described above, if the content acquisition route is the downloading from a sale site, the URL of that site is also contained in the metadata of that content.

After the registration of the processing metadata, the sort-out information generation block 12 determines in step S7 whether there is a next item, or any content not yet registered with the sort-out information is contained in the play list read from the play list storage block 11A. If any such content is found, then the procedure returns to step S1 to repeat the above-mentioned processing therefrom.

On the other hand, if no next item is found or the metadata of all pieces of content registered with the play list is found registered with the sort-out information in step S7, then the sort-out information generation block 12 ends the processing.

Repeating the above-mentioned processing generates sort-out information for each play list read from the play list storage block 11A. The generated sort-out information is outputted to the sort-out information registration block 13.

Figure 5:
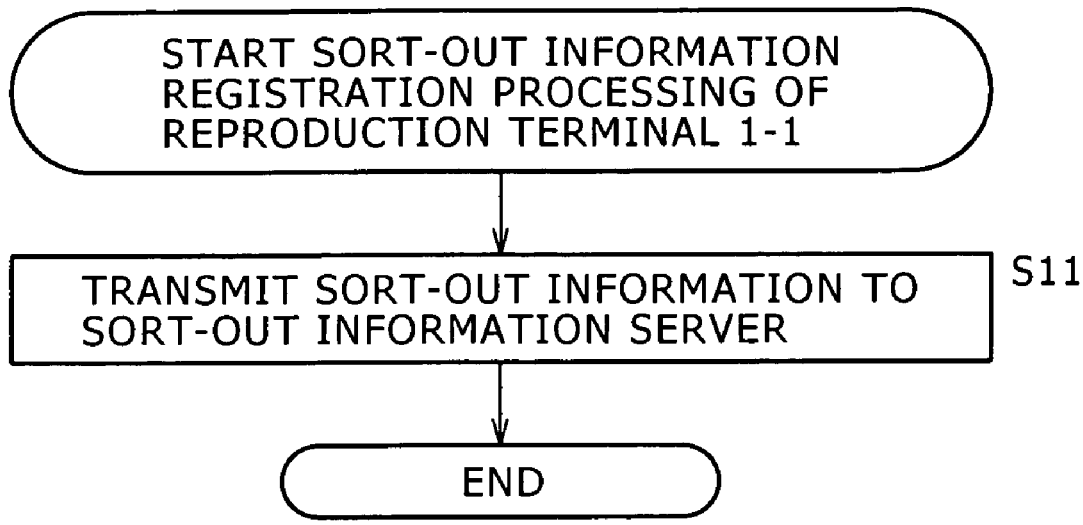
FIG. 5 is a flowchart indicative of sort-out information registration processing of the reproduction terminal.

The following describes the processing of the reproduction terminal 1-1 for registering sort-out information with reference to the flowchart shown in FIG. 5.

When the sort-out information generated by the processing as described above with reference to FIG. 4 comes from the sort-out information generation block 12, the sort-out information registration block 13 transmits the supplied sort-out information to the sort-out information server 2 for registration in step S11.

Execution of the above-mentioned processing also on devices having sort-out information generating capabilities other than the reproduction terminal 1-1 registers the sort-out information generated on the basis of play lists owned by various devices, with the sort-out information database 3 managed by the sort-out information server 2.

The following describes the processing of the reproduction terminal 1-2 for acquiring sort-out information with reference to the flowchart shown in FIG. 6.

In step S21, the sort-out information search block 21 of the reproduction terminal 1-2 notifies the sort-out information server 2 of artist name and album name for example as the conditions for sort-out information, thereby requesting the sort-out information server 2 for the provision of the sort-out information matching these conditions.

The sort-out information server 2 searches the sort-out information stored in the sort-out information database 3 for the sort-out information with the same artist name as one supplied from the sort-out information search block 21 or the same album name as one supplied therefrom included in the search metadata. If such sort-out information is found, the sort-out information server 2 transmits the retrieved sort-out information to the reproduction terminal 1-2 (or the sort-out information search block 21).

When the above-mentioned sort-out information comes, the sort-out information search block 21 gets this sort-out information in step S22 and outputs the acquired sort-out information to the sort-out information application block 22. Then, the above-mentioned processing ends.

The following describes the processing of the reproduction terminal 1-2 for creating or updating a play list on the basis of the sort-out information with reference to the flowchart shown in FIG. 7.

When the sort-out information supplied from the sort-out information search block 21, the sort-out information application block 22 gets a play list corresponding to the supplied sort-out information in step S31.

For example, by referencing a play list stored in the play list storage block 23A, the sort-out information application block 22 determines there is already a play list for managing the same content as one with metadata registered with the sort-out information. If no such a play list is found, the sort-out information application block 22 newly creates a play list for registering the content with metadata registered with the sort-out information.

Further, if the sort-out information application block 22 determines that there already exists a play list for managing the same content as one with metadata registered with the sort-out information, the sort-out information application block 22 reads and gets the play list for managing this same content from the play list storage block 23A. In this case, the read play list is updated on the basis of the sort-out information.

In step S32, the sort-out information application block 22 extracts one item registered with the sort-out information obtained in step S31. For example, if the sort-out information shown in FIG. 2 has been obtained, the sort-out information application block 22 pays attention to one item and extracts the metadata (three types of metadata) of that content.

In step S33, the sort-out information application block 22 generates a search key for searching the content database of the reproduction terminal 1-2 for content, from the search metadata in the metadata extracted in step S32. This search key is used to determine whether the content with attention paid is one owned by the user of the reproduction terminal 1-2.

For example, if the metadata of content A has been extracted, a result of logical operation AND between search metadata "A", "100", "Content A", and "Artist A" (or metadata Domain, ID, Title, and Artist) is generated as the search key.

In step S34, the sort-out information application block 22 searches the content database for content on the basis of the search key generated in step S33. This search is executed by referencing the metadata of the content stored in the content database of the reproduction terminal 1-2, of the metadata stored in the metadata storage block 23B.

For example, is a result of logical operation AND between "A", "100", "Content A", and "Artist A" is generated as a search key, then the sort-out information application block 22 searches for the content having the same metadata as this search key.

If the content having the same metadata as the search key is found for example, the sort-out information application block 22 determines that the content of current attention is the content owned by the user of the reproduction terminal 1-2 (namely, the content stored in the content database in reproducible form). If no content having the same metadata is found, the sort-out information application block 22 determines that the content of current attention is the content not owned by the user.

It should be noted that the sort-out information application block 22 may determine that the content of current attention is the content owned by the user if content is found having metadata having the degree of matching with the search key being comparatively high (or the score is comparatively high) like the matching between three of four search metadata "A", "100", "Content A", and "Artist A", for example.

In step S35, the sort-out information application block 22 determines whether the content of current attention is owned by the user. If the content of current attention is found owned by the user, then the procedure goes to step S36, in which the sort-out information application block 22 registers that content with a play list as the content reproducible by the user. On the content management screen, a reproduce button to be pressed to start content reproduction is shown adjacent to the title of this content, for example.

On the other hand, if the content of current attention is found not owned by the user in step S35, then the procedure goes to step S37, in which the sort-out information application block 22 registers this content with the play list as not reproducible by the user or as purchasable if the URL of the sale site is included in the processing metadata of the sort-out information. On the content management screen, a text indicative of the inability of reproduction or a buy button to be pressed to link to the sale site for example is shown adjacent to the title of this content.

After registering the content with the play list in step S36 or step S37, the procedure goes to step S38, in which the sort-out information application block 22 determines whether there is another item, namely whether there is any content to which attention has not been paid and not registered with the play list, in the content with metadata registered with the sort-out information.

If such content is found in step S38, the procedure returns to step S32, in which the sort-out information application block 22 repeats the above-mentioned processing therefrom. Consequently, attention is sequentially paid to the pieces of content with metadata registered with the sort-out information to determine whether or not the content is owned by the user, thereby registering the content of attention with the play list.

On the other hand, if all pieces of content are found registered with the play list in step S38, then the sort-out information application block 22 ends the above-mentioned processing.

Thus, a play list is created on the basis of the sort-out information supplied from the sort-out information server 2 and the created play list is stored in the play list storage block 23A. In the created play list, a distinction is made between the content owned by the user and the content not owned by the user, thereby enabling the displaying of the screen as shown in FIG. 3.

Figure 8:
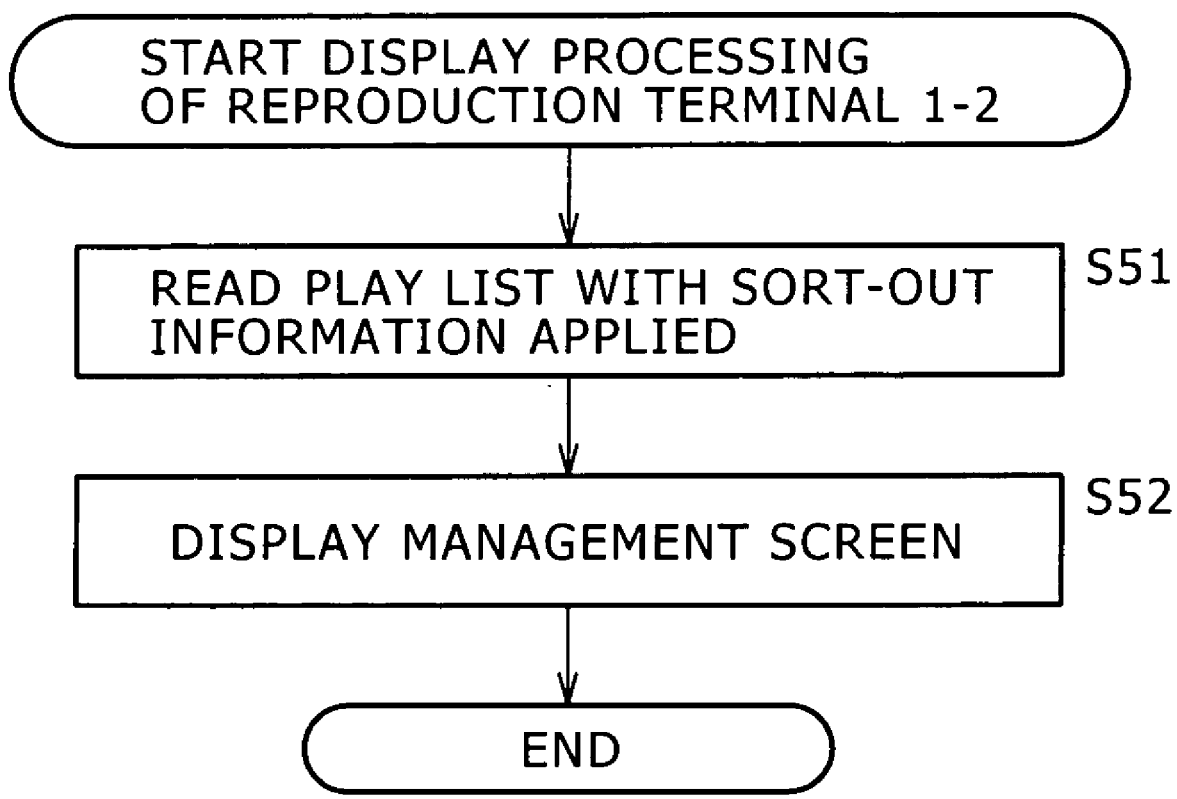
FIG. 8 is a flowchart indicative of display processing of the another reproduction terminal.

The following describes the processing of the reproduction terminal 1-2 for displaying a content management screen with reference to the flowchart shown in FIG. 8.

In step S51, the display control block 24 reads a play list with sort-out information applied (a play list newly created on the basis of the sort-out information supplied from the sort-out information server 2 or an updated play list) from the play list storage block 23A in accordance with an instruction given by the user, for example.

In step S52, the display control block 24 displays a content management screen on the basis of the read play list. In the read play list, a distinction is made between the content owned by the user and the content not owned by the user that is registered with the play list, so that the screen as shown in FIG. 3 is displayed here.

Consequently, the user is able to integrally manage content regardless whether the content is owned or not owned by the user.

In addition, each play list is automatically created from the sort-out information obtained from the sort-out information server 2, so that the user need not select content by himself to create a play list.

In the above-mentioned example, sort-out information is provided from the reproduction terminal 1-1 in which the sort-out information was created to the reproduction terminal 1-2 via the sort-out information server 2. If the reproduction terminal 1-1 and the reproduction terminal 1-2 are able to transfer data to each other, it is also practicable to provide the sort-out information from the reproduction terminal 1-1 directly to the reproduction terminal 1-2.

Referring to FIG. 9, there is shown another exemplary configuration of the information processing system. With reference to FIG. 9, components similar to those previously described with reference to FIG. 1 are denoted by the same reference numerals. Overlapping descriptions will be skipped appropriately.

In the example of FIG. 9, the reproduction terminal 1-1 and the reproduction terminal 1-2 are adapted to transfer data to each other, so that data can be provided from the reproduction terminal 1-1 directly to the reproduction terminal 1-2 without the sort-out information server 2.

An external input/output block 41 is arranged on the reproduction terminal 1-1 and an external input/output block 51 is arranged on the reproduction terminal 1-2, thereby providing communication modules capable of wireless or wired communication or interfaces capable of writing data to memory cards detachable from the reproduction terminals and reading data therefrom.

When the sort-out information generated as described above is supplied from the sort-out information generation block 12, the external input/output block 41 of the reproduction terminal 1-1 transmits the supplied sort-out information to the reproduction terminal 1-2 by wireless communication based on wireless LAN (Local Area Network) or Bluetooth (trademark), for example.

In the provision of sort-out information via a memory card, the external input/output block 41 stores sort-out information into a memory card loaded on the reproduction terminal 1-1. The memory card storing the sort-out information is passed from the owner of the reproduction terminal 1-1 to the owner of the reproduction terminal 1-2, thereby providing the sort-out information.

When sort-out information is supplied from the external input/output block 41 of the reproduction terminal 1-1 in wireless communication, the external input/output block 51 of the reproduction terminal 1-2 receives the sort-out information and outputs the received sort-out information to the sort-out information application block 22.

If sort-out information is provided via memory card, the external input/output block 51 reads sort-out information from a memory card loaded on the reproduction terminal 1-2 and outputs the read sort-out information to the sort-out information application block 22. Then, in the sort-out information application block 22, the processing of creating a play list on the basis of the sort-out information is executed, for example.

Thus, the system may be adapted to provide sort-out information from the reproduction terminal 1-1 directly to the reproduction terminal 1-2 without the sort-out information server 2.

Referring to FIG. 10, there is shown still another exemplary configuration of the information processing system. With reference to FIG. 10, components similar to those previously described with reference to FIG. 1 are denoted by the same reference numerals. Overlapping descriptions will be skipped appropriately.

In FIG. 10, sort-out information is generated by the sort-out information server 2 and the generated sort-out information is provided from the sort-out information server 2 in response to a request from the reproduction terminal 1-2. In this case, the sort-out information server 2 is managed by a provider for executing sort-out information providing services, for example.

The sort-out information server 2 is made up of a content list generation block 61, a content database 62, and a sort-out information generation block 63.

When a request comes from the sort-out information search block 21 for the provision of sort-out information satisfying predetermined conditions, the content list generation block 61 references the metadata of content stored in the content database 62 to create a content list of the content for generating the sort-out information satisfying these conditions and outputs the generated content list to the sort-out information generation block 63 along with the metadata of the content registered with the list.

For example, if a predetermined artist name is given as a sort-out information condition, the content list generation block 61 extracts the content with that artist name included in the metadata from the content stored in the content database 62, thereby generating lists in a predetermined sequence.

The content database 62 stores the metadata of content.

When a content list is supplied from the content list generation block 61, the sort-out information generation block 63 classified the metadata of the content registered with the list into three types of metadata, search metadata, display metadata, and processing metadata like the sort-out information generation block 12 of the reproduction terminal 1-1 as described above, thereby generating sort-out information. The sort-out information generation block 63 transmits the sort-out information thus generated to the reproduction terminal 1-2 (or the sort-out information search block 21).

As with the cases shown in FIGS. 1 and 9 in which the sort-out information generated by the reproduction terminal 1-1 is provided, the creation of play lists for example is subsequently executed in the reproduction terminal 1-2.

It should be noted that, in the above description, the functional block for generating sort-out information and providing the generated sort-out information to another device and the functional block for creating play lists on the basis of the supplied sort-out information for example are arranged on different terminals. It is also practicable to arrange these functional blocks on one terminal.

Referring to FIG. 11, there is shown one example of a reproduction terminal.

A reproduction terminal 101 shown in FIG. 11 basically has both the capabilities provided by the reproduction terminal 1-1 and the reproduction terminal 1-2 shown in FIG. 1. A database 111 of the reproduction terminal 101 corresponds to the database 11 of the reproduction terminal 1-1 (and the database 23 of the reproduction terminal 1-2) and a sort-out information generation block 112 of the reproduction terminal 101 corresponds to the sort-out information generation block 12 of the reproduction terminal 1-1. A sort-out information registration block 113 of the reproduction terminal 101 corresponds to the sort-out information registration block 13 of the reproduction terminal 1-1.

Further, a sort-out information search block 114 of the reproduction terminal 101 corresponds to the sort-out information search block 21 of the reproduction terminal 1-2 and a sort-out information application block 115 of the reproduction terminal 101 corresponds to the sort-out information application block 22 of the reproduction terminal 1-2. A display control block 116 of the reproduction terminal 101 corresponds to the display control block 24 of the reproduction terminal 1-2 and an external input/output block 117 of the reproduction terminal 101 corresponds to the external input/output block 41 (FIG. 9) of he reproduction terminal 1-1.

Thus, the functional block for generating sort-out information and providing the generated sort-out information to another device and the functional block for creating play lists on the basis of the supplied sort-out information may be arranged on one terminal.

In the above description, each piece of content registered with each play list is managed by making a distinction between the content owned by the user and the content not owned by the user. "Own" herein not only denotes that a particular piece of content is stored in the content database of a device having a play list (for example, the reproduction terminal 1-2) in reproducible form, but also denotes that a particular piece of content is not stored in the device having a play list but stored only in another device owned by the user of that device having a play list (for example, a personal computer owned by the user of the reproduction terminal 1-2).

In this case, the metadata storage block 23B of the reproduction terminal 1-2 stores also the metadata of the content not stored in the content database of he reproduction terminal 1-2 but stored in the personal computer of the user of the reproduction terminal 1-2. This metadata is used to determine whether there is any content owned by the user when sort-out information is provided.

If the screen shown in FIG. 3 is displayed on the reproduction terminal 1-2 on the basis of a play list for managing the content not stored in the content database of the reproduction terminal 1-2 but stored in the personal computer, information indicative that the content is owned but stored in another device (namely, the content cannot be reproduced) is shown adjacent to the title of that content.

Consequently, the user is able to integrally manage, on the reproduction terminal 1-2, the content not stored in the reproduction terminal 1-2 but stored in another device owned by the user, along with the content stored in the reproduction terminal 1-2 and the content not owned by the user.

The above-mentioned sequence of processing operations may be executed by software as well as hardware. In the software approach, the reproduction terminal 1-1 and the reproduction terminal 1-2 on which the necessary software is executed may be each configured by a personal computer shown in FIG. 12, for example.

In FIG. 12, a CPU (Central Processing Unit) 131 executes various processing operations as instructed by programs stored in a ROM (Read Only Memory) 132 or programs loaded from a storage block 138 into a RAM (Random Access Memory) 133. The RAM 133 also stores, from time to time, data necessary for the CPU 131 to execute various processing operations.

The CPU 131, the ROM 132, and the RAM 133 are interconnected via a bus 134. The bus 134 is also connected with an input/output interface 135.

The input/output interface 135 is connected with an input block 136 based on keyboard and mouse, an output block 137 based on a display monitor based on LCD (Liquid Crystal Display) and a speaker, a storage block 138 based on hard disc drive, and a communication block 139 for executing communication processing via the Internet 4.

The input/output interface 135 is also connected with a drive 140 as required. On the drive 140, a removable medium 141 such as magnetic disc, optical disc, magneto-optical disc, or a semiconductor memory is loaded from time to time. Computer programs read from the removable medium 141 are installed in the storage block 138 as required.

When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

The above-mentioned recording medium is configured not only by the removable medium 141 such as a magnetic disc (including a flexible disc), an optical disc (including CD-ROM (Compact Disc Read Only Memory), DVD (Digital Versatile Disc), a magneto-optical disc (including MD (Mini Disc) (trademark)), or a semiconductor memory recorded with programs for distribution of programs to users separately from the apparatus main, but also by the ROM 132 recorded with programs and a hard disc drive recorded with programs and included in the storage block 138 that are provided to users as incorporated in the apparatus main as shown in FIG. 12.

It should be noted herein that the steps for describing each program recorded in recording media include not only the processing operations which are sequentially executed in a time-dependent manner but also the processing operations which are executed concurrently or discretely.

It should also be noted that term "system" as used herein denotes an entire apparatus configured by a plurality of component units.

While preferred embodiments of the present invention have been described using specific terms, such description is for illustrative purpose only, and it is to be understood that changes and variations may be made without departing from the spirit or scope of the following claims.

What is claimed is:

1. A method for generating suggestions based upon a play list, the method comprising:
   at an information generating apparatus:
      storing a first play list including grouped content; and
      generating information for use by an information processing apparatus in creating a second play list, said second playlist including some of the grouped content in the first play list, the information including metadata of the grouped content in the first play list, the generating means generating the information suggesting additional content related to the grouped content; and
   at the information processing apparatus:
      acquiring the information generated by the information generating apparatus; and
      creating means for determining whether each piece of the grouped content or the metadata of the grouped content in the information acquired by the information processing apparatus is currently stored in the information processing apparatus, and creating the second play list including data indicating whether or not each piece of the additional content in the second play list is currently stored in the information processing apparatus or was previously stored in the information processing apparatus owned by the user and transferred to another device owned by the user.

2. An information processing system having an information generating apparatus and an information processing apparatus,
   the information generating apparatus comprising:
      storage means for storing a first play list including grouped content; and
      generating means for generating information for use by the information processing apparatus in creating a second play list, said second playlist including some of the grouped content in the first play list, the information including metadata of the grouped content in the first play list, the generating means generating the information suggesting additional content related to the grouped content,
   the information processing apparatus comprising:
      acquiring means for acquiring the information generated by the information generating apparatus; and
      creating means for determining whether each piece of the grouped content or the metadata of the grouped content in the information acquired by the acquiring means is currently stored in the information processing apparatus, and creating the second play list including data indicating whether or not each piece of the additional content in the second play list is currently stored in the information processing apparatus or was previously stored in the information processing apparatus owned by the user and transferred to another device owned by the user.

3. A non-transient computer readable recording medium including computer executable instructions, wherein the instructions, when executed by a processor, cause the processor to perform a method for generating suggestions based upon a play list, the method comprising:
   at an information generating apparatus:
      storing a first play list including grouped content; and
      generating information for use by an information processing apparatus in creating a second play list, said second playlist including some of the grouped content in the first play list, the information including metadata of the grouped content in the first play list, the generating means generating the information suggesting additional content related to the grouped content; and at the information processing apparatus:
  acquiring the information generated by the information generating apparatus; and
  creating means for determining whether each piece of the grouped content or the metadata of the grouped content in the information acquired by the information processing apparatus is currently stored in the information processing apparatus, and creating the second play list including data indicating whether or not each piece of the additional content in the second play list is currently stored in the information processing apparatus or was previously stored in the information processing apparatus owned by the user and transferred to another device owned by the user.

* * * * *